Patented Aug. 17, 1937

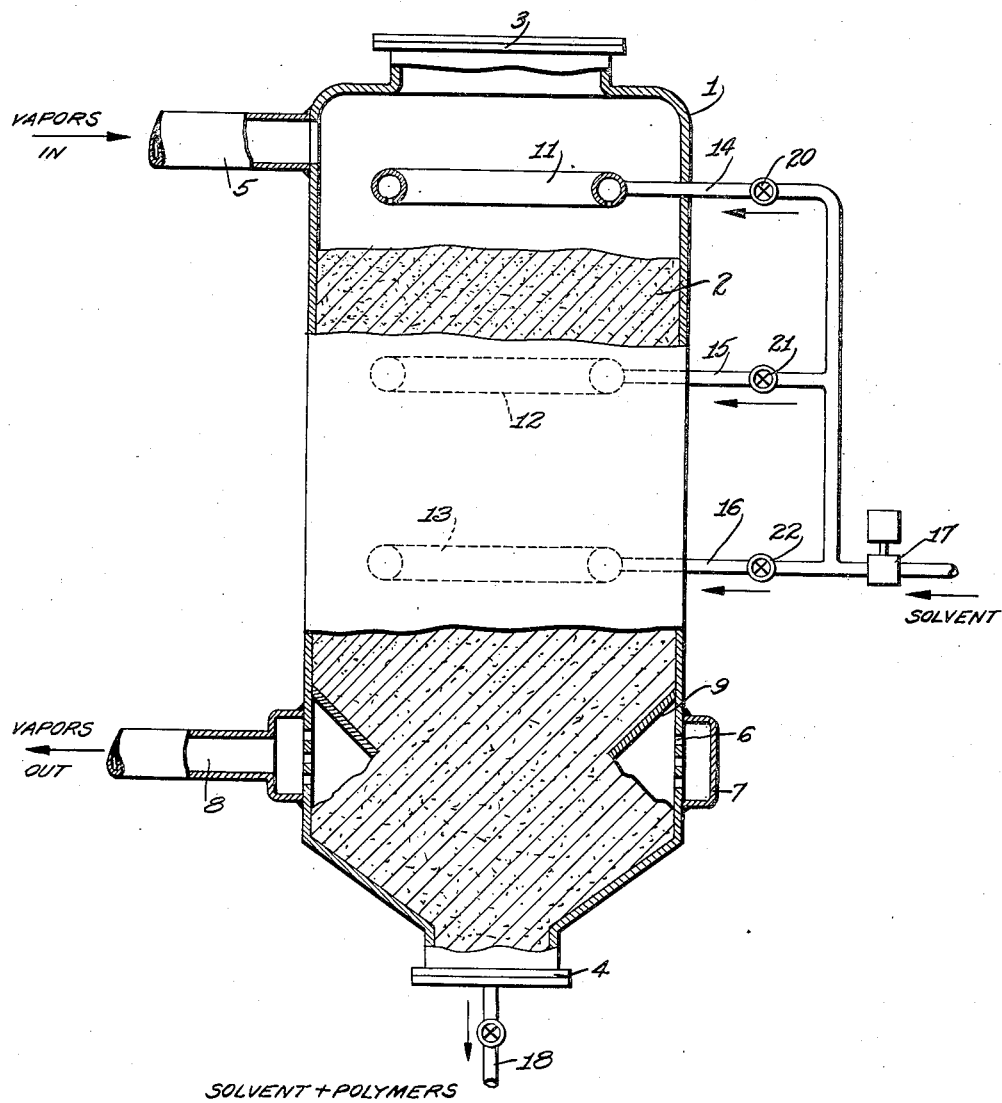

2,090,159

UNITED STATES PATENT OFFICE 2,090,159

PROCESS OF PURIFYING CRACKED HYDROCARBONS

Harris A. Smith, Port Arthur, Tex., assignor to The Texas Company, New York, N. Y., a corporation of Delaware Application May 28, 1935, Serial No. 23,803

7 Claims. (Cl. 196—96)

My invention relates to the purification of low-boiling, normally liquid cracked hydrocarbons containing unstable color-imparting and gum-forming constituents, the presence of which in a motor-fuel product is undesirable, and has for an object the provision of an improved process and apparatus for this purpose.

My invention relates more particularly to that method of purifying hydrocarbons of the character indicated in which the hydrocarbons are passed while essentially in the vapor phase through a body or bed of solid adsorptive catalytic material such as fuller's earth or the like, capable of promoting the conversion of the undesired unstable constituents of the cracked hydrocarbons to polymers of relatively high boiling point, which may readily be removed from the treated product by fractionation. This type of purification process, which may be generally referred to as "vapor-phase clay-treating", has attained a considerable degree of commercial success in the treatment of cracked hydrocarbons by reason of its selective action in effecting the conversion of the undesirable unstable unsaturated constituents of the cracked hydrocarbons without adversely affecting the desired stable unsaturated constituents which contribute to the value of cracked gasoline as a motor fuel.

In this type of process, as has been indicated, the vapors of the hydrocarbons to be treated are passed through a permeable bed of fuller's earth or other solid adsorptive catalyst effective for the purpose indicated, and the unstable constituents lying within the gasoline boiling-point range are thereby polymerized to higher boiling materials lying above the gasoline boiling-point range. During the operation of the process, the polymers, having boiling points higher than those of the vapors, tend to separate out in liquid or semi-solid form in the bed of catalytic material and if not removed as formed tend to clog the bed, thereby interfering with the free passage of the vapors therethrough and also tend to reduce the effective surface area of the adsorptive catalytic material, thus materially reducing the efficiency and effectiveness of the catalytic material in the process.

It has been customary for some time to pass the vapors being treated in a downward direction through the bed of catalytic material in order that the downward flow of the vapors may assist in the removal of the polymers from the bed of catalytic material.

It has also been customary to introduce a suitable solvent for the polymers at the top of the catalytic bed. The solvent thus introduced flows downward through the bed of catalytic material and by reason of the solvent action upon the polymers facilitates removal of the polymers and maintains the catalytic material in an active condition for a longer period of time than would be true if the solvent were omitted. The use of added solvent, such for example as a portion of the purified and condensed hydrocarbons, may be supplemented if desired by condensation of a portion of the higher boiling constituents of the material being treated, or condensation alone may be used to furnish the solvent. This method of operation, however, involves either condensation of the part of the gasoline itself or the passage through the catalyst of hydrocarbons higher boiling than the desired gasoline product. Moreover, due to the exothermic nature of the reactions involved in the polymerization of the unstable constituents which occurs during the passage of the vapors through the bed, it is somewhat difficult to maintain the bed of contact material throughout its length or depth at a temperature effective to cause such condensation, and even where such condensation can be obtained it is difficult to regulate it closely enough to cause the production of the exact amount of gasoline condensate required as a solvent for the polymers, especially since the amount of polymers in the lower portions of the catalytic bed exceeds the amount of polymers in the upper portions of the bed.

Where the vapors are passed downwardly through the bed of catalyitc material, the upper portion of the bed theoretically tends to be more rapidly diminished in effectiveness and theoretically the catalytic material in the lower portion of the bed tends to be relatively fresh in character after a given period of operation inasmuch as the lower portion of the bed is the last to be traversed by the vapors and is therefore traversed by vapors containing a lower concentration of unstable constituents. In practice, however, the lower portion of the bed is burdened by the flow of polymers produced in the upper portion of the bed and the effectiveness of the relatively fresh adsorbent catalyst in the lower portion of the bed is obscured and reduced by an abnormal concentration of polymers, so that that portion of the catalyst last traversed by the vapors becomes spent before the remaining portion. Partly for the purpose of overcoming this difficulty, the vapors are sometimes conducted through two separate clay-treating chambers in series. However, such construction is expensive and does not entirely overcome the disadvantage noted, although a plurality of beds may be used for other reasons.

I have observed that where solvent is introduced merely to the upper portion of the bed or where the solvent is produced by condensation in the bed, the flow of solvent through the bed is greatest in the upper portions of the bed, sometimes approaching substantial uniformity of flow through the entire bed but never resulting in a larger flow of solvent in the lower portion of the bed than in the upper portion. This is due in considerable part to the fact that the polymerizing reactions are exothermic and the heat liberated in these reactions tends to cause vaporization of the solvent as it traverses the bed. The result of this is that the concentration and flow of solvent are greatest in those portions of the bed in which the concentration of polymers is lowest, which is obviously undesirable.

I have found that better results are obtainable when the flow of solvent in the lower portions of the bed is greater than in the upper portions, that is to say, when the rate of flow of solvent increases along the path of the vapors through the catalytic bed. My invention therefore contemplates maintaining a varying flow of solvent throughout the several portions of the bed in proportion to the amount of polymers formed in the several portions of the bed and passing therethrough. Whereas in the usual instance, the vapors pass downwardly through a vertically disposed bed of catalytic material I maintain a greater flow of solvent through the lower portion than through the upper portion of the bed, and I accomplish this by introducing solvent at one or more points intermediate the point of introduction of the vapors to the bed and the point of removal of the treated vapors from the bed, and I provide for regulation of the flow of solvent to offset the effect of the exothermic reaction taking place within the bed, thereby providing for a relatively large flow of solvent in the portion of the bed last traversed by the vapors. I may supply a solvent to the top of the bed and at one or more points in the bed, the rate of introduction of the solvent at the several points of introduction being so regulated with due regard to the vaporizing effect of the exothermic rise in temperature in the bed that the solvent introduced at any point in the bed is sufficient to provide a greater flow of solvent below this point of introduction than above it, thereby increasing the flow of solvent through the bed in the direction in which the vapors are passing.

In this manner I am able to maintain that portion of the catalytic material last traversed by the vapors in a more active condition than has heretofore been possible, thus obtaining more uniform utilization of the catalytic material throughout the bed, reducing the resistance of the bed to the flow of vapors therethrough and overcoming irregularities of operation such as channeling of the vapors in the bed due to uneven accumulation of polymers therein, and I insure that each portion of the bed will be provided with just that amount of solvent necessary to maintain the polymers in a freely flowing condition and the clay in an active state without unsuitably drenching any portion of the bed of catalytic material.

I therefore provide suitable means for introducing a solvent liquid to a treating tower of the character indicated at one or more points intermediate the height thereof, and valves or other regulating devices for governing the flow of solvent at the various points of introduction to the bed.

In order that my invention may be clearly set forth and understood, I now describe, with reference to the drawing accompanying and forming a part of this specification, a preferred manner and form in which my invention may be practiced and embodied, but without limiting my invention specifically to such preferred illustrative example. In this drawing, The single figure is a partly elevational and partly cross-sectional view of apparatus for contacting cracked hydrocarbon vapors with solid adsorptive catalytic material in accordance with the process of my invention and illustrating a simple form of apparatus in accordance with my invention.

Referring now to the drawing, there is illustrated a vessel 1 of conventional type adapted to contain a bed 2 of solid adsorptive catalytic material, such as fuller's earth or the like. In the instance shown, the bed of catalytic material 2 is illustrated as occupying the entire lower portion of the vessel 1 and the vessel 1 is provided with a removable cover 3 and a removable base plate 4 for introduction of fresh catalytic material and removal of spent catalytic material, respectively.

In the preferred instance hydrocarbon vapors to be treated are introduced through the upper portion of the vessel 1 through an inlet pipe 5 and pass downwardly through the catalytic contact material 2, during the course of which passage the catalyst effects a conversion of the undesired unstable constituents of the hydrocarbons to polymers of relatively high boiling point.

The treated vapors then pass through an annular series of perforations 6 into an annular manifold 7 lying outside the vessel 1 and communicating with a vapor-outlet pipe 8. With this form of construction it is advantageous to provide a shed or shelf 9 lying immediately above the annular series of perforations 6 in order to prevent stoppage of the latter by the catalyst.

It will be obvious to those skilled in the art that while I have illustrated a preferred form of apparatus, other types of catalyst-containing vessels commonly used in the art may be employed, for example, a vessel in which the catalytic material is supported upon a perforated false bottom or screen lying above the actual bottom of the vessel.

For the purpose of maintaining the polymers formed during the passage of the vapors through the bed in a free-flowing condition and thereby effecting their removal by gravity from the bed of catalytic material, I provide a plurality of sprays 11, 12 and 13 located at various vertically spaced points along the flow of the vapors through the bed. The upper spray 11 is preferably located above the top of the bed, while the sprays 12 and 13 are located at spaced points intermediate the point of introduction of the vapors to the bed and the point of withdrawal of the treated vapors from the bed. Obviously the specific character of the spray devices 11, 12 and 13 as well as the number and specific location of these spray devices will depend upon the size and shape of the bed and the nature of the results desired. Moreover, while I have not illustrated the manner in which the spray devices 11, 12 and 13 are supported it will be obvious to anyone skilled in the art that suitable hangers, braces or other supporting devices may be provided as necessary.

A suitable hydrocarbon solvent, such for example as a portion of the condensate obtained from the treated vapors withdrawn at 6, is supplied to the spray devices 11, 12 and 13 in regulated amount by means of conduits 14, 15 and 16, all communicating with a pump 17 which in turn communicates with a suitable source of the solvent. Valves 20, 21 and 22 are provided in the lines 14, 15 and 16 respectively for regulation of the respective rates of flow of solvent through these pipes.

In the operation of the apparatus illustrated in the drawing, cracked hydrocarbon vapors, which may come either from the main fractionating tower of a cracking unit or may comprise cracked gasoline vapors liberated in a rerunning operation, enter the vessel 1 through the inlet 5 and pass downwardly through the bed 2, polymers being formed in the process as has been stated hereinabove. The amount of solvent supplied at 11 will of course be that necessary to maintain the polymers formed above the spray 12 in a fluid condition, due allowance being made for the vaporization caused by the exothermic reactions taking place in the bed. The amount of solvent supplied at 12 will be sufficient to replenish the solvent lost by evaporation in the upper portion of the bed and to provide a combined flow of solvent to that portion of the bed lying between the sprays 12 and 13 sufficient to maintain the polymers in a fluid condition and to offset the effect of evaporation; it being understood that the evaporation of solvent in itself tends to dissipate the exothermic heat liberated in the bed to some extent. Similarly, the amount of solvent supplied at 13 will be adequate to provide for the maintenance of the polymers below the spray 13 in a fluid condition and may be greater or less than that supplied at 12, or equal thereto, according to the prevailing conditions. It will be obvious that it is not necessarily required that the amount of solvent supplied at 12 and 13 be actually greater than the amount supplied at 11 inasmuch as the solvent introduced at 12 is joined by solvent flowing from the upper portion of the bed, and the same effect will be observed at the spray 13. In any event, however, it is possible to provide for sufficient solvent in the lower portion of the bed to maintain the proper fluidity and removal of polymers without having to supply an excessive quantity of solvent to the upper portion of the bed, the effect of which would be undesirable.

The gasoline vapors supplied to the bed may preliminarily be fractionated to the desired gasoline end-boiling-point or if desired they may be fractionated to a slightly higher boiling point in order to provide for condensation of a portion of the vapors in the bed to assist in the removal of polymers therefrom. It is ordinarily desirable to provide for the inclusion in the vapors to be treated of a small portion of naphtha constituents lying above the end-boiling-point of the final desired gasoline product. In any event, however, sufficient solvent is supplied at one or more intermediate portions of the bed to insure that the total amount of solvent traversing the lower portion of the bed or the last portions of the bed traversed by the vapors undergoing treatment will be greater than that in the upper or earlier portions of the bed.

While I have described my invention hereinabove with respect to a preferred type of operation and a preferred apparatus embodiment it will readily be understood by those skilled in the art that my invention is not limited to such preferred illustrative examples but may variously be practiced and embodied within the scope of the claims hereinafter made.

I claim:

1. In the method of purifying normally liquid low-boiling cracked hydrocarbons by passing such low-boiling cracked hydrocarbons while essentially in the vapor phase downwardly through a treating zone containing a substantially continuous bed of solid adsorptive catalytic material effective to promote conversion of undesired unstable constituents of such hydrocarbons to polymers of relatively high boiling points, the improvement which comprises introducing a suitable solvent for such polymers into said bed at a plurality of spaced points, and maintaining a greater flow of solvent through the lower portions of said bed than through the upper portions thereof.

2. In the method of purifying normally liquid low-boiling cracked hydrocarbons by passing such hydrocarbons while essentially in the vapor phase downwardly through a treating zone containing a substantially continuous bed of solid adsorptive catalytic material effective to promote conversion of undesired unstable constituents of such hydrocarbons to polymers of relatively high boiling points, the improvement which comprises introducing a suitable solvent for such polymers above said bed, passing said solvent polymers downwardly through substantially the entire length of said bed to remove polymers therefrom and introducing additional solvent for said polymers at an intermediate point in said bed to supplement the supply of solvent introduced into the top of said bed and cause a greater flow of solvent through the lower portions of said bed than through the upper portions thereof.

3. In the method of purifying normally liquid low-boiling cracked hydrocarbons by passing such hydrocarbons while essentially in the vapor phase downwardly through a treating zone containing a substantially continuous bed of solid adsorptive catalytic material effective to promote conversion of undesired unstable constituents of such hydrocarbons to polymers of relatively high boiling points, the improvement which comprises introducing a suitable solvent for such polymers into said bed at a plurality of spaced points, withdrawing said solvent together with polymers contained therein from substantially the bottom portion only of said bed, and maintaining a greater flow of solvent through the lower portions of said bed than through the upper portions thereof.

4. In the method of purifying normally liquid low-boiling cracked hydrocarbons by passing such hydrocarbons while essentially in the vapor phase through a treating zone containing a substantially continuous bed of solid adsorptive catalytic material effective to promote conversion of undesired unstable constituents of such hydrocarbons to polymers of relatively high boiling points, the improvement which comprises introducing a suitable solvent for such polymers into said bed at a plurality of spaced points, withdrawing said solvent together with polymers contained therein from substantially the bottom portion only of said bed, and maintaining a greater flow of solvent through the lower portions of said bed than through the upper portions thereof.

5. In a process for purifying normally liquid low-boiling hydrocarbons wherein said hydrocarbons are passed while essentially in the vapor phase through a treating zone containing a substantially continuous bed of solid adsorbent material effective to promote conversion of undesired unstable constituents of said hydrocarbons to relatively higher boiling polymers and polymers thus formed and condensed from said vapors flow downwardly into successively lower portions of said bed, the improvement which comprises introducing a suitable solvent for such polymers into said bed at a plurality of spaced points, and varying the flow of said solvent in respective lower portions of said bed in accordance with the amount of polymers contained in said respective portions.

6. A method for purifying normally liquid low-boiling cracked hydrocarbons, which comprises passing said hydrocarbons while essentially in the vapor phase through a treating zone containing a substantially continuous bed of solid adsorbent material effective to promote the conversion of undesired unstable constituents of the hydrocarbons to polymers of relatively high boiling points, simultaneously passing a suitable solvent for such polymers downwardly through substantially the entire depth of said bed in a substantially unobstructed flow, and progressively increasing the flow of said solvent in successive lower portions of said bed in proportion to the increase in polymers contained in said portions.

7. A method for purifying normally liquid low-boiling cracked hydrocarbons, which comprises passing said hydrocarbons while essentially in the vapor phase downwardly through a treating zone containing a substantially continuous bed of solid adsorbent material effective to promote the conversion of undesired unstable constituents of the hydrocarbons to polymers of relatively high boiling points, simultaneously introducing into said bed a suitable solvent for such polymers at a point in the upper portion of said bed, passing said solvent downwardly through the bed, introducing additional solvent for said polymers at an intermediate point in said bed, withdrawing solvent together with polymers contained therein from substantially the bottom portion only of said bed, and regulating the amount of solvent introduced at said intermediate point to compensate for solvent lost by evaporation in the upper portion of said bed between said points of introduction and to provide an increased flow of said solvent in a lower portion of said bed below said intermediate point proportional to the increase in polymers contained in said lower portion.

HARRIS A. SMITH.